United States Patent
Cruz et al.

(10) Patent No.: US 8,499,349 B1
(45) Date of Patent: Jul. 30, 2013

(54) DETECTION AND RESTORATION OF FILES PATCHED BY MALWARE

(75) Inventors: Marvin Ubaldo Cruz, Bulacan (PH);
Kerr Bryner Ang, Caloocan (PH);
Marilyn Melliang, Manila (PH);
Benjamin Rivera, Bulacan (PH)

(73) Assignee: Trend Micro, Inc., Tokyo (JP)

( * ) Notice: Subject to any disclaimer, the term of this patent is extended or adjusted under 35 U.S.C. 154(b) by 541 days.

(21) Appl. No.: 12/428,161

(22) Filed: Apr. 22, 2009

(51) Int. Cl.
*G06F 21/00* (2006.01)

(52) U.S. Cl.
USPC ............................ 726/24; 726/25; 726/30

(58) Field of Classification Search
USPC .......................... 726/23–25, 27–32
See application file for complete search history.

(56) References Cited

U.S. PATENT DOCUMENTS

| | | | | |
|---|---|---|---|---|
| 6,031,830 A * | 2/2000 | Cowan | | 370/338 |
| 6,594,686 B1 * | 7/2003 | Edwards et al. | | 709/203 |
| 6,629,109 B1 * | 9/2003 | Koshisaka | | 1/1 |
| 6,971,018 B1 * | 11/2005 | Witt et al. | | 713/187 |
| 7,337,327 B1 * | 2/2008 | Sallam | | 713/189 |
| 7,340,775 B1 * | 3/2008 | Tarbotton et al. | | 726/24 |
| 2003/0041259 A1 * | 2/2003 | Vignoles et al. | | 713/200 |
| 2004/0230318 A1 * | 11/2004 | Shimizu | | 700/1 |
| 2005/0005152 A1 * | 1/2005 | Singh et al. | | 713/200 |
| 2006/0230451 A1 * | 10/2006 | Kramer et al. | | 726/22 |
| 2008/0178298 A1 * | 7/2008 | Arai et al. | | 726/29 |
| 2008/0244556 A1 * | 10/2008 | Plante et al. | | 717/170 |

* cited by examiner

*Primary Examiner* — Jung Kim
*Assistant Examiner* — Tri Tran
(74) *Attorney, Agent, or Firm* — Beyer Law Group LLP

(57) ABSTRACT

A monitor agent monitors every write request for files that are capable of being patched (executable files). Once a write request is requested for one of these files, the agent creates a copy of the file and also saves the original file version number. If the program that is requesting the write access has not been digitally signed then that program is flagged as being suspicious. The write request is allowed to proceed and the file is modified by the requesting program. After the modification, if the file version number is not higher then the write is flagged as being suspicious. If both the requesting program has been flagged as suspicious and the file version number has been flagged as suspicious, then the requesting program is labeled as being malware. The monitor agent restores the modified file using the original copy. If either the requesting program is flagged as suspicious or the file version number is flagged as suspicious, then the requesting program is labeled as being suspicious.

42 Claims, 4 Drawing Sheets

User Computer

DETECTION AND RESTORATION OF FILES PATCHED BY MALWARE

FIELD OF THE INVENTION

The present invention relates generally to the detection of malware on a computer. More specifically, the present invention relates to detection of a file that has been patched by malware.

BACKGROUND OF THE INVENTION

Computer programs are certainly not without errors, or "bugs." If it is not possible to rewrite the computer program (or to work around the bug somehow) then a software "patch" is applied to fix the bug. A patch is a small piece of software designed to fix problems with or to update a computer program or its supporting data. The patch fixes bugs, replaces graphics, improves performance, etc. Typically, patches are distributed as binary code instead of as source code. This type of patch modifies the program executable file—the program the user actually runs—either by modifying the executable file to include the patch or by completely replacing the executable file.

Patches vary in size from bytes to megabytes; replacing entire files results in larger patches, for example. Compared with the initial installation of software, patches usually do not take long to apply. In fact, to facilitate updates, computer operating systems provide for automatic updates that will either download and apply patches automatically or will ask for user permission before downloading and applying the patches. In either case, the patches are applied transparently and nearly instantaneously from the perspective of the user.

Generally, the primary goal of patching a file is to alter the file or to alter the program flow of execution. There are a few reasons why one would patch a file. One reason is to provide a quick workaround to fix a security vulnerability of the computer program. A security patch is applied to prevent exploitation of the computer program by a user or by malware, either on purpose or inadvertently. A second reason is to implement a feature request or to implement a bug fix of the target program.

Unfortunately, unscrupulous individuals and other writers of computer malware have begun using this program patching technique to automatically execute malware. In other words, malware writers and hackers are now using legitimate files to automatically execute malicious programs. For example, if a hacker modifies a few crucial bytes of a legitimate file (e.g., the operating system file "user32.dll") similar to a software patch, executing this legitimate file will eventually cause invocation of a malware program. In layman's terms this technique can be described as malware "piggy-backing" on a legitimate file.

A technique is desired to detect such an illegal software patch and to restore a file that has been patched in this fashion.

SUMMARY OF THE INVENTION

To achieve the foregoing, and in accordance with the purpose of the present invention, an automatic technique to detect an unauthorized patched file is disclosed that does not incur a false alarm, along with a technique of immediately restoring the file.

In one specific embodiment, a monitor agent of an end-user computer monitors file access requests for all files that are capable of being patched (for example, executable files). Once an access request is requested for one of these particular files, the monitor agent creates a copy of the file to be modified and also saves the original file version number. If the program that is requesting the access has not been digitally signed then that program is flagged as being suspicious. The request is then allowed to proceed and the file is modified by the requesting program. After the modification, if the file version number is not higher then the modification is also flagged as being suspicious. If either flag has been set then the monitor agent alerts the user that it is likely that the requesting program is malware and that the file has been affected by malware.

If both the requesting program has been flagged as suspicious and the file version number has been flagged as suspicious, then the requesting program is labeled as being malware. The monitor agent restores (either with or without user approval) the modified file using the original copy it saved earlier. The user, or any anti-virus software, may then take appropriate action with respect to this suspicious program.

One benefit of the present invention is its ability to detect any malware that performs illegal file patching. In addition, it has a feature that can automatically restore the file that has been illegally patched. The invention does not use and does not require continuous virus signature updates from an Internet server; thus, the invention minimizes network bandwidth usage and hard drive space requirements on the customer side. The invention can also detect new malware or a new malware variant whereas previous approaches were often ineffective in detecting unknown malware.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Figure 1:
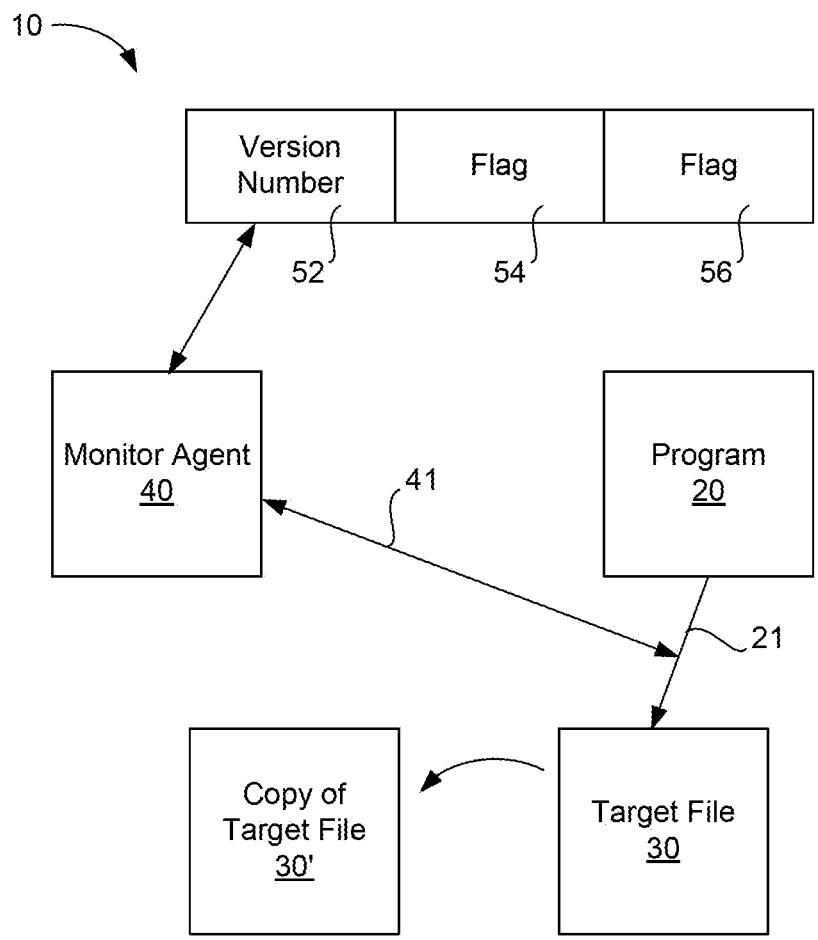
FIG. 1 is a block diagram of programs, files and memory present on a user computer.

Traditional anti-virus software products (i.e., anti-malware products) protect computers by using signature-based detection. In other words, every computer file on a customer's computer is checked for a possible match against a set of known virus signatures. But, the problem with this approach is that it can be difficult to detect the modification made on a patched file since only a few bytes may have been changed from the original file. A false positive may result if only a few bytes are relied upon for detecting a match with a signature. In addition, anti-malware products need to continuously update a database of malicious signatures in order to keep up with this type of malware. As the number of malware programs rises, the database of malicious signatures must also necessarily increase in size. An ever-increasing database of signatures consumes more and more network bandwidth and hard drive space during deployment customers.

An alternative approach is to create a checksum for an entire file (and a checksum for an authorized patched version of the file). Checksums may then be compared to detect illegally altered files. The main drawback to this approach is that it is file-specific detection. It would be necessary to create checksums for all variants of the patched file; considering that there are many versions and localizations for each file (e.g., the Japanese version of "user32.dll" is different from English version), this approach rapidly becomes unwieldy. Furthermore, a checksum approach is not optimal for files that may be maliciously modified.

One other approach to the illegal patching of computer files is to use a special monitor program that checks the digital signatures of files. Files that are found to have invalid digital signatures are assumed to have been compromised (i.e., patched illegally). The Microsoft operating system implements this technique in a system file checker (SFC) module. But, there are two drawbacks to this technique: (1) it only works if each file is digitally signed—few files are digitally signed, thus limiting coverage; and (2) malware writers have found a way to disable the monitor program, thus rendering the technique ineffective.

Invention Overview

In the view of the above, and after careful consideration of various techniques, advantages and drawbacks, the present invention recognizes that a valid modification of a computer file has the following characteristics: (1) the program modifying the computer file does have a valid digital signature because these programs generally are valid installers, automatic updaters, hot patch installers, service package installers, etc.; and (2) the file version number of the computer file after a valid modification should generally be higher to indicate the updated version.

In one specific embodiment of the invention, the technique operates as follows. A monitor agent (a computer program) monitors every Write request for all files that are capable of being patched (e.g., EXE, DLL or SCR files). Once a Write request is requested for one of these particular files, the monitor agent creates a copy of the file to be modified and also saves the original file version number. If the program that is requesting the Write access has not been digitally signed then that program is flagged as being suspicious. The Write request is then allowed to proceed and the file is modified by the requesting program. After the modification, if the file version number is not higher then this aspect of the modification is also flagged as being suspicious. If both the requesting program has been flagged as suspicious and the file version number has been flagged as suspicious, then the requesting program is tagged as being malware. The monitor agent then restores the modified file using the original copy it saved earlier. On the other hand, if either the requesting program is flagged as suspicious or the file version number is flagged as suspicious, but not both, then the requesting program may simply be tagged as being suspicious. The user, or any anti-virus software, may then take appropriate action with respect to this suspicious program.

Block Diagram

FIG. 1 is a block diagram of programs, files and memory present on a user computer 10. Typically, the software shown is present upon each end-user computer within a computer network of an enterprise. Not shown are standard computer software and hardware. Included is a monitor agent 40 that monitors 41 requests 21 by any software program 20 to modify a target file 30. The monitor agent may create a copy 30' of the target file and may also store in memory the version number 52 and various flags 54 and 56.

Flow Diagram

Figure 2A:
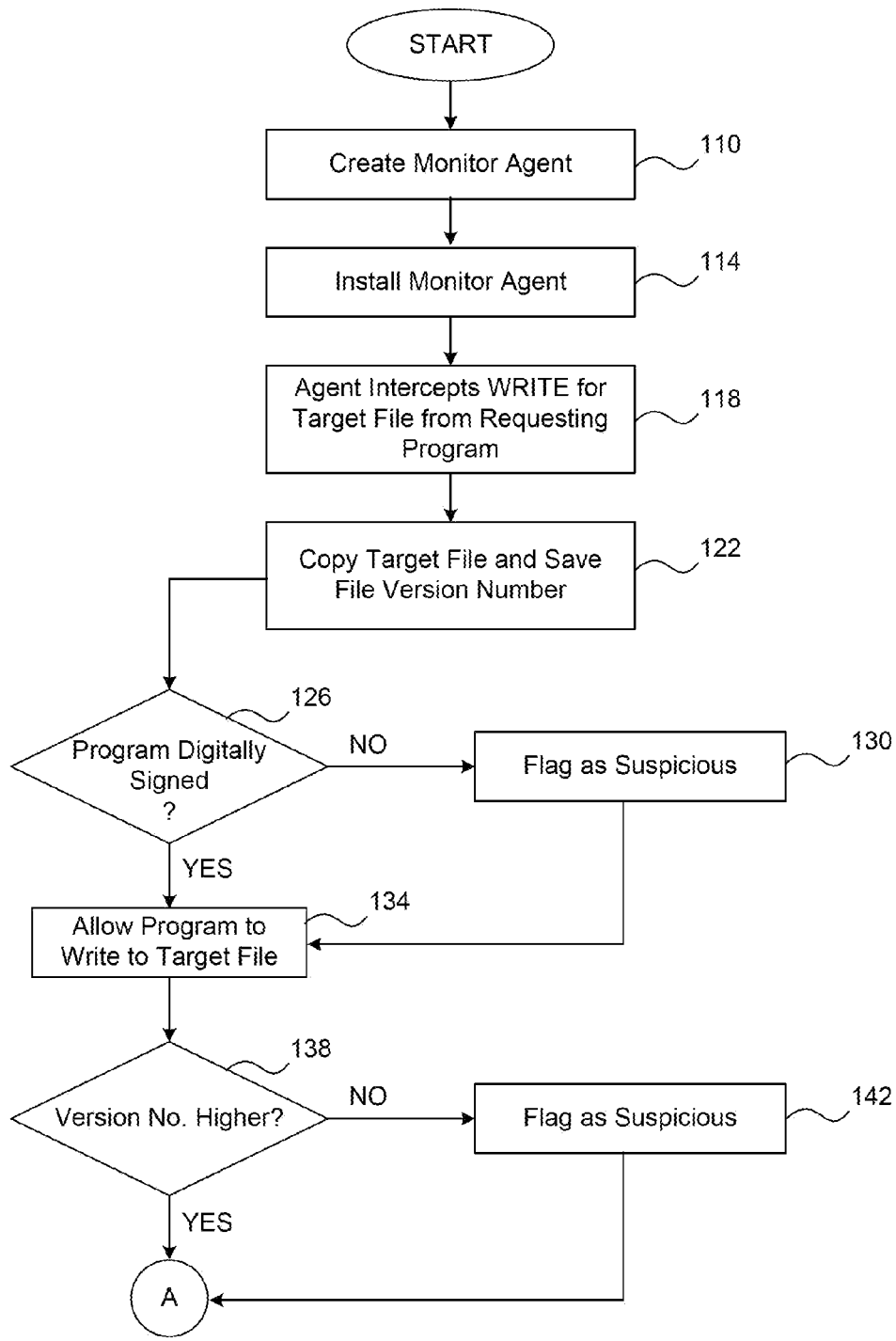
FIGS. 2A and 2B are a flow diagram describing one embodiment by which a monitor agent detects illegal patching of a target file.
Figure 2B:
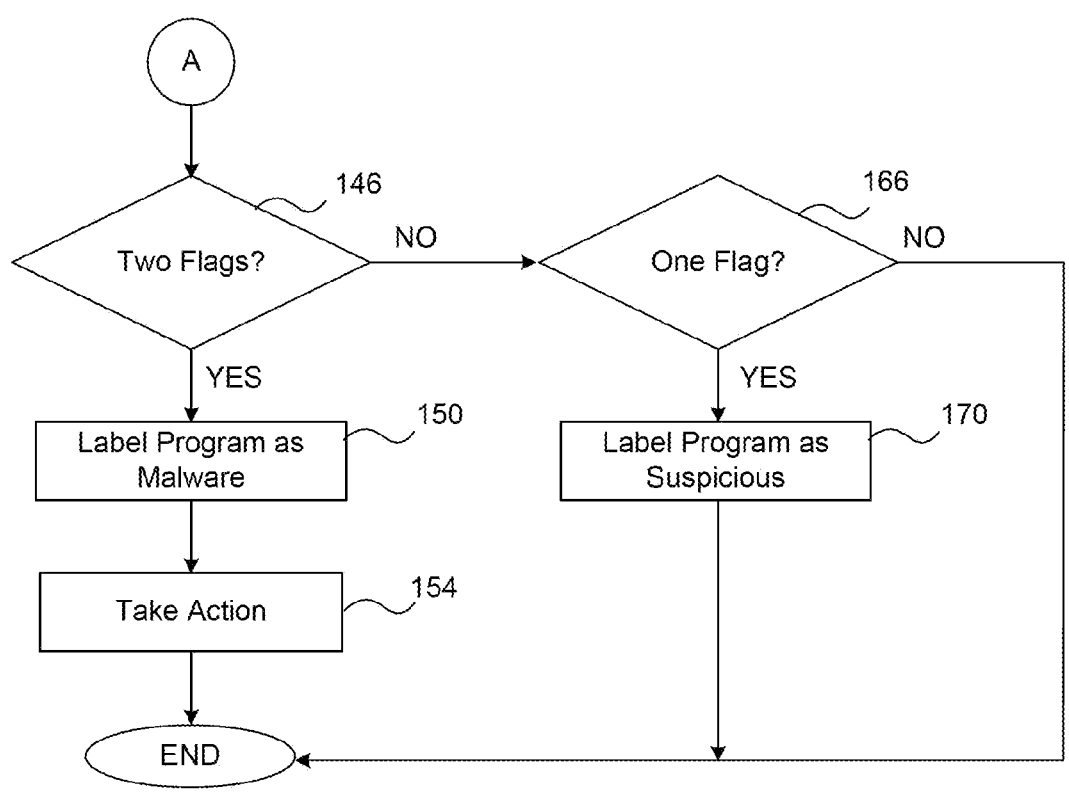

FIGS. 2A and 2B are a flow diagram describing one embodiment by which a monitor agent detects illegal patching of a target file. In step 110 a monitor agent program is created to perform the steps described below. The agent may be written in any suitable computer language and languages such as C and C++ are most appropriate. One characteristic of the agent is that it is preferable that the agent is always running upon a user computer such that it is constantly monitoring requests to modify executable files. The agent can be written and implemented to always be running by registering it as a service or daemon process. Another preferred method is to register the agent as a file-filter driver. By registering a program (such as the agent) as a Microsoft operating system Service, the operating system will ensure that the program is always running. Alternatively, creating and registering a file-filter driver program means that one will be notified of events (by the operating system) that pertain to file access.

Figure 3A:
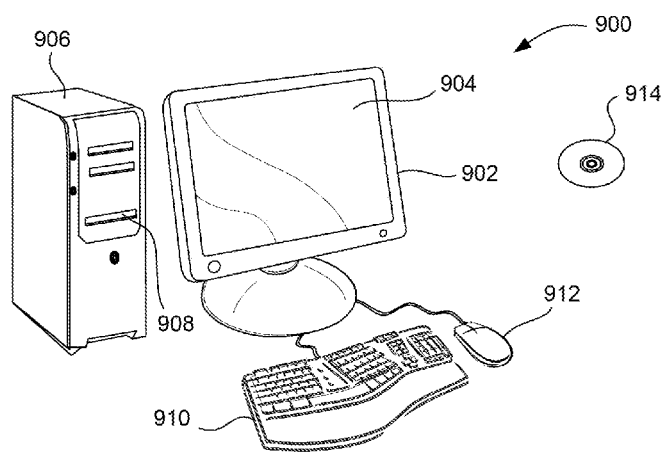
FIGS. 3A and 3B illustrate a computer system suitable for implementing embodiments of the present invention.
Figure 3B:
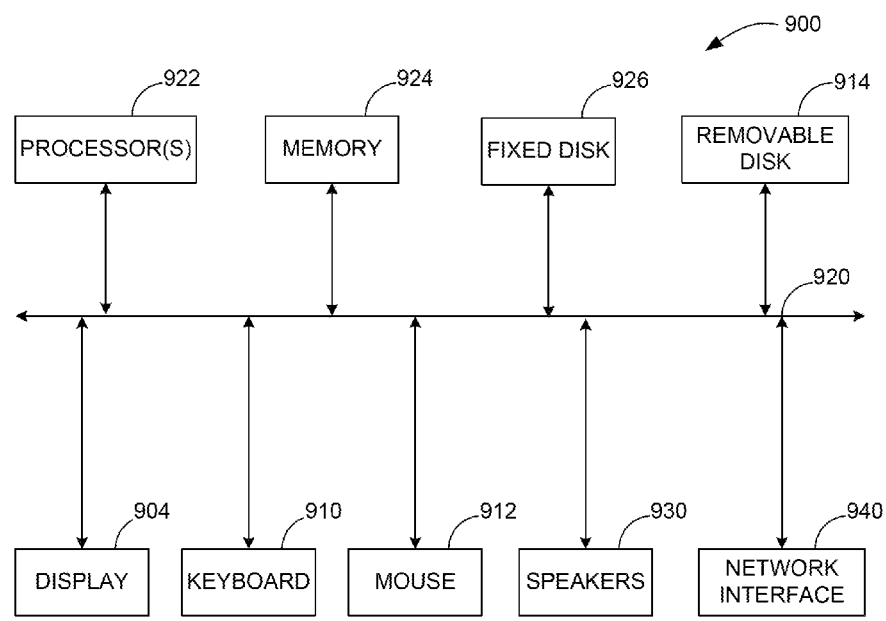

In step 114 a copy of the monitor agent is installed upon each user computer within a computer network where it is desired to detect illegal patching of files by malware. The agent is typically installed on a computer using standard installation programs and may be implemented as a service program within an operating system, as a file-filter driver, or as combination of both working together. FIG. 1 illustrates a conceptual view of the monitor agent within a computer and FIGS. 3A and 3B illustrate a typical computer in which the monitor agent may operate.

In step 118 the agent 40 intercepts a file access request from a requesting program 20 to modify a target file 30. Although the agent may be configured to intercept any type of file access request, preferably the agent is only concerned with file access requests that have the potential to modify the target file, for example, write requests, open requests, modify requests, etc. Although any file type may be monitored for access, preferably the invention focuses upon target files that are binary executable files (i.e., image files), such as EXE, SCR, COM, DLL files and others. By monitoring executable files, the invention is able to detect when the file is illegally patched, potentially resulting in the executable file inadvertently launching a malware program.

One technique for intercepting a file access request from the requesting program is to use API hooking as is known in the art. The hook module hooks any application programming interface (API) calls related to file access, such as a call to write a file. For example, the API "ZwCreateFile" may be hooked. Other operating system commands related to file access or file writing may also be hooked. Once an API is hooked, the monitor agent is notified of when the requesting program is attempting to write to a target file and the agent may then take appropriate action as described below. Other techniques to intercept a file access request may also be used. For example, the Microsoft operating system provides a way by which a user (or a program such as the monitor agent) is notified when a designated set of files are modified. Using this technique, any executable files may be designated as a set. This technique is loosely called layered drivers. In one embodiment, we use a file-filter driver.

Because the program is attempting to write to the target file, the monitor agent preferably makes a copy of the target file before the program performs the write operation. By hooking the appropriate APIs or by using a file-filter driver the agent gains exclusive control of the file and holds the file, thus preventing the program from changing the target file before the agent makes a copy. Therefore, in step 122 once the agent realizes that a target file is about to be modified by a requesting program it may take certain actions. For example, the agent creates a copy of the target file for later use if the original target file becomes infected by malware. This copy is preferably stored in memory for better performance or may be stored on disk. The agent also saves the file version number of the original target file in a temporary memory buffer 52. In one embodiment, the agent uses an operating system API to determine the version number of the file. When an executable file is compiled and linked the compiler/linker typically generates a file version number which is saved within the file. This file version number is also available by looking at the "Properties" of a file from a user interface.

In step 126 the agent determines if the requesting program has been digitally signed. As is known in the art, various third parties (such as VeriSign, Inc.) certify that commercial software comes from the software publisher and ensure that no alteration was made after publication of the software. The third party adds a digital signature to the software, and this digital signature may then be checked by an operating system (for example by calling an API) to determine the authenticity of the digital signature. The presence of a valid digital signature indicates not only that the software really did come from the software publisher, but also that the software has not been modified. Users of a digitally-signed program files are provided with a near guarantee that the software is free from malware as it is extremely unlikely that a commercial software company would release software infected with malware. Although some commercial programs are not digitally signed, many are, and the lack of a digital signature indicates that the requesting program is suspicious. Operating system programs such as the Microsoft updater program, hot-fix programs and service pack installers are also digitally signed. The agent determines if the requesting program has been digitally signed by calling an API such as "CPVerifySignature."

In step 130 if it is determined that the requesting program has not been digitally signed then the agent stores a flag 54 indicating that the requesting program is suspicious. On the other hand, if the program is digitally signed then in step 134 the program is allowed to write to the target file. Alternatively, the check for the digital signature in step 126 may be performed after step 134 in which case the program is allowed to write as soon as the agent has had an opportunity to copy the target file and save the version number in step 122.

In step 138 once the target file has been modified the agent determines if the new version number is higher than the old version number. The agent makes a call to an API (e.g., "GetFileVersionInfo") to determine the new version number and compares this new version number with the saved version number 52. If the new version number is not higher then in step 142 the agent sets a flag 56 in temporary memory indicating that the write operation is suspicious because the version number has not been increased. Typically, an updated version of a file downloaded and installed by an operating system (to fix a security problem, for example) will have a new version number included with it. Because malware typically does not care about the version number the malware will not increase the version number when it illegally patches a file. Thus, a modified file without a higher version number is a good indication that the file has been modified by malware.

It is believed not possible for malware to increase the version number of a file when it modifies the file. In theory, modification by malware of the version number is not possible as the Microsoft operating system does not provide a function (e.g., an API call) to modify file version information. Adjusting the file version manually by hand (e.g., through the use of binary editors) would require very detailed knowledge of how this file version information is stored in a file. And, a brute-force modification such as this would not always work.

After both steps 138 and 142 control moves to step 146 were the agent performs an analysis to determine if it is likely that malware is present. In step 146 the agent determines if both flags 54 and 56 have been set. Both flags being set indicates that not only is the requesting program unsigned, but also that the requesting program did not increase the version number of the target file. If so, it is determined that the requesting program is likely to be malware and in step 150 it is labeled as malware.

Next, in step 154 the monitor agent takes a specific action such as reverting to the original version of the target file. For example, the agent directs that the copy of the target file 30' should replace the original version of the target file 30 because it is likely that the original version has been affected by malware. The user may also be presented with the option of reverting to the original file rather than automatically reverting. In addition, the agent may take other actions such as informing the user that the requesting program is malware and that the target file has been affected, performing a virus scan of the requesting program 20, removing the requesting program, or, automatically sending the file to a remote server for further investigation. There are numerous possible actions that could be taken. Any actions may be configurable based on user preference. For example, many users would prefer to put a warning in a log file for later viewing, while others may prefer a simple pop-up notification. A combination of many actions is also possible.

On the other hand, if both flags have not been set, but in step 166 it is determined that one flag has been set, then in step 170 the agent labels the requesting program as being suspicious. Step 170 may include displaying a pop-up warning window to the user advising that the requesting program might be malware or that the target file might be infected, providing the user the option of reverting to the original version of the target file (by using the copy), providing the user the option of performing a virus scan, or any of the actions mentioned above.

Thus, the monitor agent of the present invention is able to detect when malware attempts to illegally patch an executable file and is able to inform the user and revert to the original version is necessary. Furthermore, the agent can detect if file activity is merely suspicious and inform the user of various options.

Computer System Embodiment

FIGS. 3A and 3B illustrate a computer system 900 suitable for implementing embodiments of the present invention. FIG. 3A shows one possible physical form of the computer system. Of course, the computer system may have many physical forms including an integrated circuit, a printed circuit board, a small handheld device (such as a mobile telephone or PDA), a personal computer or a super computer. Computer system 900 includes a monitor 902, a display 904, a housing 906, a disk drive 908, a keyboard 910 and a mouse 912. Disk 914 is a computer-readable medium used to transfer data to and from computer system 900.

FIG. 3B is an example of a block diagram for computer system 900. Attached to system bus 920 are a wide variety of subsystems. Processor(s) 922 (also referred to as central processing units, or CPUs) are coupled to storage devices including memory 924. Memory 924 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable of the computer-readable media described below. A fixed disk 926 is also coupled bi-directionally to CPU 922; it provides additional data storage capacity and may also include any of the computer-readable media described below. Fixed disk 926 may be used to store programs, data and the like and is typically a secondary storage medium (such as a hard disk) that is slower than primary storage. It will be appreciated that the information retained within fixed disk 926, may, in appropriate cases, be incorporated in standard fashion as virtual memory in memory 924. Removable disk 914 may take the form of any of the computer-readable media described below.

CPU 922 is also coupled to a variety of input/output devices such as display 904, keyboard 910, mouse 912 and speakers 930. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 922 optionally may be coupled to another computer or telecommunications network using network interface 940. With such a network interface, it is contemplated that the CPU might receive information from the network, or might output information to the network in the course of performing the above-described method steps. Furthermore, method embodiments of the present invention may execute solely upon CPU 922 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

Although the foregoing invention has been described in some detail for purposes of clarity of understanding, it will be apparent that certain changes and modifications may be practiced within the scope of the appended claims. Therefore, the described embodiments should be taken as illustrative and not restrictive, and the invention should not be limited to the details given herein but should be defined by the following claims and their full scope of equivalents.

We claim:

1. A method of detecting malware in a computer, said method comprising:
    detecting a file access operation by a monitor agent of said computer, said file access operation indicating a program of said computer attempting to modify a target file of said computer;
    saving, by said monitor agent, a file version number of said target file;
    determining whether said program has been digitally signed by a third party;
    allowing said program to modify said target file according to said file access operation;
    determining whether a new file version number of said modified target file matches said saved file version number; and
    alerting a user of said computer that said program is suspected of being malware when it is determined that said program has not been digitally signed and when it is determined that said new file version number matches said saved file version number and wherein said saving of said file version number of said target file is performed before said allowing of said program to modify said target file and after said detecting of said file access operation indicating said program attempting to modify said target file.

2. A method as recited in claim 1 further comprising:
    determining that said program has not been digitally signed and determining that said new file version is not greater than said saved file version; and
    alerting said user of said computer that said program is malware.

3. A method as recited in claim 1 further comprising:
    providing said user of said computer with an option to revert to said original target file.

4. A method as recited in claim 1 further comprising:
    executing said monitor agent on said computer, said monitor agent executing continuously.

5. A method as recited in claim 1 wherein said file access operation is a write operation.

6. A method as recited in claim 1 wherein said target file is an executable file.

7. A method as recited in claim 1 wherein a digital signature of said program by said third party indicates a certification that said program is free of malware.

8. The method of claim 1, wherein the target file is a binary executable file.

9. The method of claim 1, wherein the detecting is performed using API hooking.

10. The method of claim 1, wherein the saving, determining whether said program has been digitally signed by a third party, allowing, determining whether a new file version number of said modified target file matches said saved file version number, and alerting occur in response to the detecting.

11. The method of claim 10, wherein the detecting involves using an API hook to detect a change to an executable file at the time the change is occurring.

12. The method of claim 1, further comprising treating the modified target file as safe if the new file version number is greater than the saved file version number.

13. The method of claim 10, wherein the detecting involves using an API hook to detect a change to an executable file at the time the change is occurring.

14. The method of claim 10, wherein the detecting involves using an API hook to detect a change to an executable file at the time the change is occurring.

15. The method of claim 1 wherein said program is not arranged to change said version number of said target file.

16. The method of claim 1 further comprising:
    determining that said new file version number matches said saved file version number; and
    notifying the user of said computer that said program is suspected of being malware wherein the notifying operation is caused by the determination that said new file version number matches said saved file version number.

17. The method of claim 1 wherein the alerting operation is not performed unless the new file version number matches said saved file version number.

18. The method of claim 1 further comprising:
determining that said program has not been digitally signed;
determining that said new file version number matches said saved file version number;
determining that the program is suspected of being malware because said program has not been digitally signed and because the new file version number matches said saved file version number wherein the determining that the new program is suspected of being malware does not require obtaining continuous virus signature updates from the Internet; and
alerting said user of said computer that said program is suspected of being malware wherein said saving of said file version number of said target file is performed before said allowing of said program to modify said target file and after said detecting of said file access operation indicating said program attempting to modify said target file.

19. A method of detecting malware in a computer, said method comprising:
detecting a file access operation by a monitor agent of said computer, said file access operation indicating a program of said computer attempting to modify a target file of said computer;
saving, by said monitor agent, a file version number of said target file;
saving, by said monitor agent, a copy of said target file;
determining whether said program has been digitally signed by a third party;
allowing said program to modify said target file according to said file access operation;
determining whether a new file version number of said modified target file matches said saved file version number; and
alerting a user of said computer that said program is suspected of being malware when it is determined that said program has not been digitally signed and when it is determined that said new file version number matches said saved file version number and wherein said saving of said file version number of said target file is performed before said allowing of said program to modify said target file and after said detecting of said file access operation indicating said program attempting to modify said target file.

20. A method as recited in claim 19 further comprising:
determining that said program has not been digitally signed and determining that said new file version is not greater than said saved file version; and
alerting said user of said computer that said program is malware.

21. A method as recited in claim 19 further comprising:
providing said user of said computer with an option to revert to said original target file; and
overwriting said modified target file with said copy of said target file.

22. A method as recited in claim 19 further comprising:
executing said monitor agent on said computer, said monitor agent executing continuously.

23. A method as recited in claim 19 wherein said file access operation is an operation having the potential to modify said target file.

24. A method as recited in claim 19 wherein said target file is an executable file.

25. A method as recited in claim 19 further comprising:
allowing said program to modify said target file only after said monitor agent has copied said target file.

26. The method of claim 19, wherein the monitor agent is installed on each user computer within a computer network.

27. The method of claim 19, wherein the detecting a file access operation by a monitor agent of said computer, saving, by said monitor agent, a file version number of said target file, saving, by said monitor agent, a copy of said target file, determining whether said program has been digitally signed by a third party, allowing said program to modify said target file according to said file access operation, determining whether a new file version number of said modified target file matches said saved file version number, and alerting occur in response to the detecting.

28. The method of claim 19, further comprising treating the modified target file as safe if the new file version number is greater than the saved file version number.

29. The method of claim 19 wherein said program is not arranged to change said version number of said target file.

30. The method of claim 19 further comprising:
determining that said new file version number matches said saved file version number; and
notifying the user of said computer that said program is suspected of being malware wherein the notifying operation is caused by the determination that said new file version number matches said saved file version number.

31. The method of claim 19 wherein the alerting operation is not performed unless the new file version number matches said saved file version number.

32. A method of detecting malware in a computer, said method comprising:
detecting a file access operation by a monitor agent of said computer, said file access operation indicating a program of said computer attempting to modify a target file of said computer;
saving, by said monitor agent, a file version number of said target file;
determining that said program has not been digitally signed by a third party;
allowing said program to modify said target file according to said file access operation;
determining that a new file version number of said modified target file matches said saved file version number; and
alerting a user of said computer that said program is malware when it is determined that said program has not been digitally signed and when it is determined that said new file version number matches said saved file version number and wherein said saving of said file version number of said target file is performed before said allowing of said program to modify said target file and after said detecting of said file access operation indicating said program attempting to modify said target file.

33. A method as recited in claim 32 further comprising:
saving, by said monitor agent, a copy of said target file; and
allowing said program to modify said target file only after said monitor agent has copied said target file.

34. A method as recited in claim 32 further comprising:
providing said user of said computer with an option to revert to said original target file; and
overwriting said modified target file with said copy of said target file.

35. A method as recited in claim 32 further comprising:
executing said monitor agent on said computer, said monitor agent executing continuously.

36. A method as recited in claim 32 wherein said file access operation is a write operation or an open file operation.

37. A method as recited in claim 32 wherein said target file is an executable file.

38. The method of claim 32, wherein the saving, determining that said program has not been digitally signed by a third party, allowing, determining that a new file version number of said modified target file matches said saved file version number, and alerting occur in response to the detecting.

39. The method of claim 32, further comprising treating the modified target file as safe if the new file version number is greater than the saved file version number.

40. The method of claim 32 wherein said program is not arranged to change said version number of said target file.

41. The method of claim 32 further comprising:
  determining that said new file version number matches said saved file version number; and
  notifying the user of said computer that said program is suspected of being malware wherein the notifying operation is caused by the determination that said new file version number matches said saved file version number.

42. The method of claim 32 wherein the alerting operation is not performed unless the new file version number matches said saved file version number.

\* \* \* \* \*